March 15, 1955     E. D. MATTIX     2,703,981
FLOW MEASURING DEVICE
Filed June 18, 1948
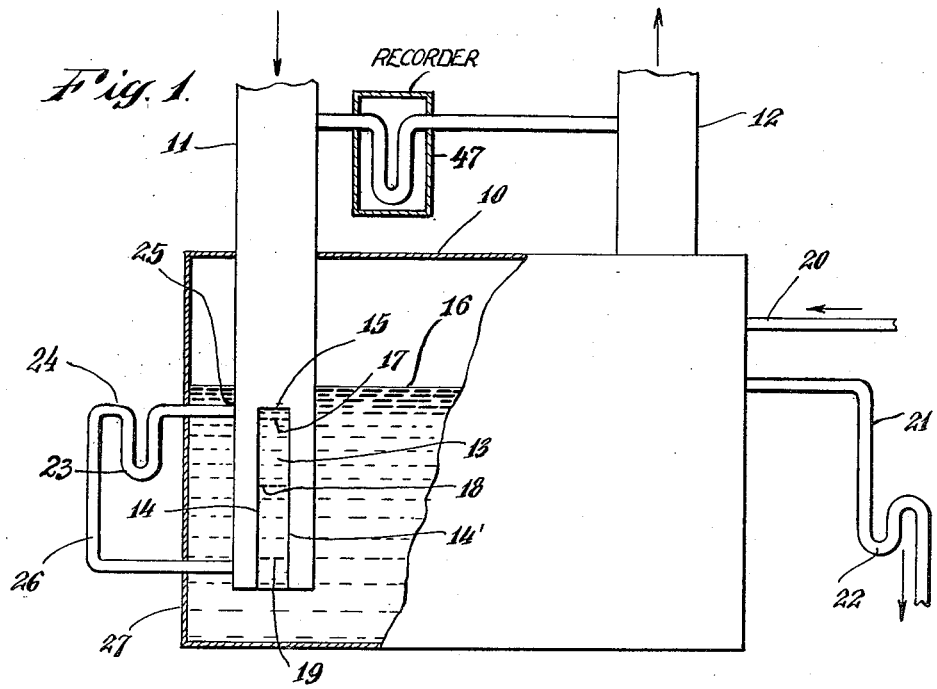
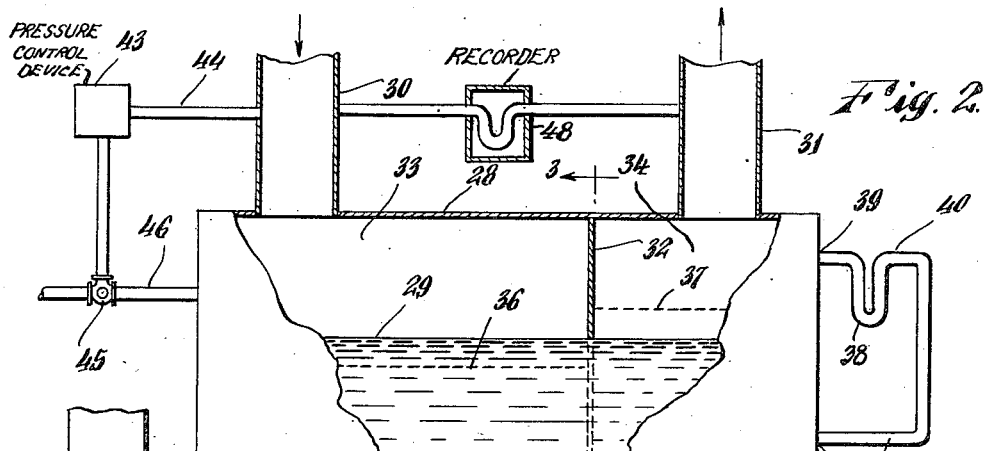
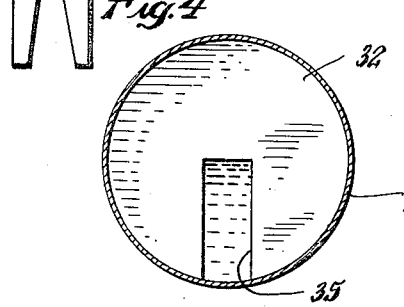
INVENTOR.
Emory D. Mattix
BY
ATTORNEY.

United States Patent Office 2,703,981
Patented Mar. 15, 1955

2,703,981

FLOW MEASURING DEVICE

Emory Dale Mattix, Lake Charles, La., assignor to Cities Service Refining Corporation, Lake Charles, La., a corporation of Delaware Application June 18, 1948, Serial No. 33,899

3 Claims. (Cl. 73—207)

This invention relates to flow measuring devices and more particularly to a device for accurately measuring flows of gases.

It is an object of this invention to provide a metering device for flows of gas which will be accurate over very widely varying rates of flow.

It is a further object of this invention to provide a metering device for flows of gas presenting a minimum of obstruction to the passage of the gas, thus avoiding the building up of undesirable back pressure in the gas line.

Other objects and advantages of this invention will become apparent as the disclosure proceeds.

It is particularly important that a gas measuring device which is accurate over very wide limits be available for use in measuring widely varying flows of gases, such as, for example, flows of gas in the flare gas system of an oil refinery. These gas flows may be extremely small when operating under normal conditions, but may suddenly become very large when all or a part of the refinery equipment is shut down, and it becomes necessary to immediately vent all of the gases in the system in order to avert an explosion. It is extremely important, in the latter instance, to vent the gases as fast as possible, and to present the minimum obstruction to their flow, in order to avoid building up back pressure in the system, which might rupture the gas lines.

I have invented an accurate measuring device for widely varying gas flows which will provide a minimum obstruction to the flow of large volumes of gas. The device presents a variable orifice which can readily and automatically adapt itself to the flow of gas at varying rates, and thus presents no great obstacle to the passage of gas at surge rates. This is accomplished by leading the gas through a chamber containing water or other inert liquid and by providing a gate in the chamber between the inlet side and the outlet side of the chamber, the top of which is below the normal water level in the chamber. When a flow of gas occurs the water at the intake side of the gate is displaced by the gas pressure, and the liquid level will drop to a level at which the gas may flow through the gate to the gas outlet line. The pressure at the intake side of the gate will vary with the rate of flow, as will the liquid level, thus exposing a variable gate area sufficient to allow the passage of the gas without building up undue back pressure. Means are provided for measuring the gate area exposed, and since this area will vary with the rate of flow of the gas, an accurate measurement of the flow may be obtained.

The means by which my invention may be put into practice may be more fully understood by those versed in the art by reference to the accompanying drawings forming a part of this specification, in which:

Fig. 1 is an elevation view partly in cross section of one embodiment of my invention in which an inverted weir for the escape of gases is provided in the incoming flow line;

Fig. 2 is an elevational view partly in cross section of another embodiment of my invention in which the inverted weir is placed across the liquid chamber; and Fig. 3 is a vertical cross sectional view of the embodiment of Fig. 2 as it would appear when viewed along the line 3—3 of Fig. 2, and Figs. 4 and 5 illustrate alternative weir shapes suitable for use in my invention.

Similar numbers refer to similar parts throughout the several views of the drawing and specification.

Referring particularly to Fig. 1, a chamber 10 is provided, having a gas inlet line 11 and a gas outlet line 12. The gas inlet line 11 extends downwardly into the chamber 10 to a point near the bottom thereof, and is provided with an inverted weir 13, through which gas may escape, extending upwardly from the bottom of the inlet line 11, and having sides 14 and 14' and a top 15. The chamber 10 is filled with a liquid to the level indicated by the line 16, which level 16 is above the top 15 of the inverted weir 13.

When gas begins to flow through the system, the gas pressure will force the level of the liquid present within the inlet line 11 down to a point where the gas may escape through the weir 13 and thence through the outlet line 12. Thus, for small flows of gas, the water level within the inlet line 11 may be depressed to a level indicated by the dotted line 17, exposing a small orifice area defined by the top 15, the sides 14 and 14' of the weir 13, and the liquid level 17. A somewhat larger flow of gas caused by an increase in pressure in the inlet line 11 will tend to force the liquid level within the inlet line 11 down to a position approximated by the dotted line 18, while an increase in pressure in the inlet line 11 sufficient to cause very large flow of gas will tend to force the liquid level within the inlet line 11 down to a position which may be approximated by the dotted line 19. Thus, as the rate of flow of gas increases, the area of the orifice through which it may escape increases, in the first instance to an area defined by the top and sides of the weir 13 and the dotted line 18; in the second instance to an area defined by the top and sides of the weir 13 and the dotted line 19.

The liquid displaced from the interior of the inlet line 11 due to the flow of gas will flow out into the interior of the chamber 10, and will normally tend to raise the liquid level 16. Since, for purposes hereinafter set forth, it is desirable to maintain the liquid level 16 constant, and since gases passing through my improved metering device will evaporate or entrain substantial quantities of liquid, means are provided for replenishing the liquid supply and for maintaining the liquid level 16 constant, said means being illustrated in Fig. 1 as a make-up liquid inlet line 20, entering the chamber 10 at a point above the normal liquid level 16, and an overflow line 21 connected to the chamber 10 at a point level with the liquid level 16. The overflow line 21 is provided with a trap 22, which may be of any conventional design, in order to prevent the escape of gases from the chamber 10 through the overflow line 21.

As has been pointed out above, increased flows of gas through the system will have the effect of increasing the area of orifice opening of the weir 13 in some fixed proportion to the rate of flow of the gas which proportion is determined by the shape of the weir walls, and a means for measuring the orifice opening will serve as a means for measuring the rate of flow.

It will be apparent to those skilled in the art that as the rate of flow of gas in the system varies, the pressure in the inlet line 11 will vary as the sum of two variables, first, the pressure necessary to force the gas through the system were no measuring device interposed, and second, the pressure necessary to force down the liquid level within the inlet line 11. This latter pressure will vary directly with the height of the column of liquid displaced, measured from the liquid level within the inlet line 11 to the liquid level 16 in the chamber 10.

The pressure in the chamber 10 above the liquid level 16 will also vary directly with the pressure necessary to force the gas through the outlet line 12, for any given flows of gas, and, since the liquid level 16 is maintained constant, the pressure at any point in the chamber 10 will vary in the same amount as the pressure above the liquid level 16. Since, however, lines 11 and 12 are part of the same system, the pressures necessary to force gas through the system at the point of entry of the line 11 into the chamber 10, and at the point of exit of the line 12 from the chamber 10, would be substantially identical, were no measuring device interposed between such points.

It will thus be evident that when gas is flowing through a system including my measuring device, a pressure differential will exist at all times between the pressure in the inlet line 11 and the interior of the chamber 10, and that the pressure differential will vary with the rate of flow of the gas, and so will serve as a measure of the area exposed of the weir 13.

Means are provided for measuring such varying differentials in pressure, which means are illustrated in Fig. 1 as a U tube manometer 23, which may or may not be of the recording type, connected to the gas inlet line 11 by means of a pressure line 24 at a point 25 on the same elevation as the top of weir 15, and connected to the gas inlet line 11 by means of a pressure line 26 at a point 27 near the bottom thereof.

Referring more particularly to Figs. 2 and 3, in which a different embodiment of my invention is illustrated, a chamber 28 is provided containing a liquid the level of which is normally in the position indicated by the line 29. The chamber 28 is provided with an intake gas line 30 and an outlet gas line 31. A barrier wall 32 is provided in the chamber 28 defining an inlet portion 33 and an outlet portion 34 of the chamber 28, the barrier wall 32 being provided with an inverted weir 35 which extends downwardly from a level slightly below the normal liquid level 29 to the bottom of the chamber 28.

When no gas in flowing through the system, the liquid level 29 will be maintained slightly above the top of the weir 35 in both the inlet portion 33 and the outlet portion 34. However, when sufficient pressure builds up in the inlet line 30 to cause gas to flow through the system, the pressure of the gas will force the liquid level in the inlet portion 33 of the chamber 28 down to a level approximated by the dotted line 36, thus uncovering a portion of the weir 35 through which the gas may escape to the outlet portion 34 of the chamber 28 and thence through the outlet line 31 to disposal. The level approximated by the dotted line 36 will vary with the rate of flow of gas, thus the weir area exposed will also vary with the rate of flow of the gas. The lowering of the liquid level in the inlet chamber 33 will cause a concomitant rise of the liquid level in the outlet chamber 34 as approximated by the dotted line 37, this level also varying with the rate of flow of gas through the system.

It will be readily appreciated that variations in the liquid level 37 may be correlated with the exposed orifice area of the weir 35, under varying conditions of flow, and that a measurement of the height of the liquid level 37 will serve to measure the exposed orifice area of the weir 35 and accordingly measure the rate of flow of gas through the system, since the rate of flow determines the area of the exposed orifice of the weir 35. Means are provided for measuring this height, such means being illustrated in Fig. 2 as a U tube manometer 38, connected to the outlet chamber 34 at a point 39 near the top thereof by a pressure line 40, and connected to the outlet chamber 34 at a point 41 near the bottom thereof by a pressure line 42, whereby the differential in pressure between the points 39 and 41 may be measured.

Since gas flowing through the system will evaporate or carry over with it into the outlet line 31 a portion of the liquid contained in the chamber 28, it is necessary to supply means for maintaining a constant volume of liquid within the interior of the chamber 28. It is possible to calculate the quantities of liquid which will be carried over by various rates of flow of gas passing through the system, and as these rates of flow are proportional to pressure existing in the inlet line 30, it is possible by measuring this pressure to supply make-up liquid to the interior of the chamber 28 at controlled rates varying with the rate of flow of the gas in the system. Means for effectuating such a controlled rate of flow are illustrated in Fig. 2 as a direct pressure control device 43 connected to the inlet line 30 by a pressure line 44. The direct pressure control device 43 operates a control valve 45 controlling the flow of liquid into the chamber 28 through a feed line 46.

It will be apparent to those skilled in the art that many modifications of instrumentation may be incorporated in my new and improved device for measuring flows of gases. For instance, in both exemplifications a pressure differential recording means such as U tube manometers 47 and 48 may be interposed between the inlet line to the chamber and the outlet line. It will be apparent that this differential will be a measure of the orifice area exposed of the weir and that flows of gas may be accurately metered by this means.

My invention is not to be considered as limited by the form of inverted weir shown in the drawings, since this weir may have various cross sectional shapes in order to more easily measure the flow of gas; for instance, the weir may be made wide at the top narrowing in width towards the bottom, or it may be narrow at the top and may grow progressively wider toward the bottom as illustrated in Fig. 4. The sides of the weir may be either straight or may be curved as illustrated in Fig. 5, as may seem best for the particular operation for which it is designed.

My new flow measuring device is simple in construction and may be easily installed in any presently existing gas line. Since the orifice area is automatically enlarged by an increase in gas flow, there is no danger of clogging, and no undesirable back pressures will be built up in the system. A free flow of gas through the measuring device is provided for under both normal and abnormal operating conditions.

Having thus described my invention, what I claim is:

1. A device for measuring a gas flow including in combination means forming a chamber containing a liquid, a gas inlet line to said chamber vertically extending within and to a point near the bottom of the chamber, said inlet line having an inverted weir in the wall thereof, the top of the weir being below the normal level of the liquid in the chamber, a gas outlet line leading from the said chamber, a fluid line communicating with the inlet line at a point above the depressed level of the liquid within the inlet line and at a point near the bottom of the inlet line, and means interposed in said fluid line operative to indicate the liquid level in the gas inlet line.

2. A device for measuring a gas flow according to claim 1 including means for maintaining a constant level of liquid in the chamber.

3. A device for measuring a gas flow according to claim 2 in which the means for maintaining a constant liquid level include a liquid inlet line connecting with the chamber at a point above the normal liquid level, and a liquid overflow line connecting with the chamber at a point level with the normal liquid level in the chamber.

References Cited in the file of this patent

UNITED STATES PATENTS

| | | |
|---|---|---|
| 1,206,490 | Werner | Nov. 28, 1916 |
| 1,215,669 | Liese | Feb. 13, 1917 |

FOREIGN PATENTS

| | | |
|---|---|---|
| 164 | Great Britain | 1858 |
| 222,974 | Germany | June 11, 1910 |
| 572,095 | Germany | Mar. 10, 1933 |